United States Patent
Stopper

(10) Patent No.: US 6,705,022 B2
(45) Date of Patent: Mar. 16, 2004

(54) METHOD AND APPARATUS FOR DETERMINING A PINION BEARING MOVE TO ALIGN A PINION-TO-GEAR ASSEMBLY

(75) Inventor: Edward M. Stopper, Etters, PA (US)

(73) Assignee: Metso Minerals Industries, Inc., Milwaukee, WI (US)

(*) Notice: Subject to any disclaimer, the term of this patent is extended or adjusted under 35 U.S.C. 154(b) by 0 days.

(21) Appl. No.: 09/682,768

(22) Filed: Oct. 16, 2001

(65) Prior Publication Data

US 2003/0070314 A1 Apr. 17, 2003

(51) Int. Cl.[7] ................................................. G01B 3/50
(52) U.S. Cl. ........................... 33/702; 33/501.7; 33/562; 33/613
(58) Field of Search .......................... 33/702, 562, 563, 33/1 N, 501.7, 501.13, 613, 645, 542; 451/47; 74/409

(56) References Cited

U.S. PATENT DOCUMENTS

| | | | | |
|---|---|---|---|---|
| 2,241,692 A | * | 5/1941 | Williams | 33/487 |
| 2,546,532 A | * | 3/1951 | Wade | 33/471 |
| 2,653,387 A | * | 9/1953 | Cameron | 33/430 |
| 3,434,365 A | | 3/1969 | Quenneville | |
| 3,559,881 A | * | 2/1971 | Maison | 235/61 B |
| 4,001,980 A | | 1/1977 | Wallin | |
| 4,120,091 A | * | 10/1978 | Borgato | 33/1 SB |
| 4,336,711 A | | 6/1982 | Maehara et al. | |
| 5,112,131 A | | 5/1992 | Pryor | |
| 5,231,875 A | | 8/1993 | Honda | |
| 5,610,994 A | | 3/1997 | Stadtfeld et al. | |
| 5,615,485 A | * | 4/1997 | Stoneberg | 33/27.03 |
| 5,656,106 A | | 8/1997 | Amateau et al. | |
| 5,824,168 A | | 10/1998 | Miyamoto et al. | |
| 5,901,454 A | | 5/1999 | Stadtfeld et al. | |
| 5,918,495 A | | 7/1999 | Miyamoto et al. | |
| 5,940,302 A | | 8/1999 | Pryor | |
| 6,138,055 A | | 10/2000 | Pryor | |
| 6,170,326 B1 | | 1/2001 | Juranitch et al. | |

FOREIGN PATENT DOCUMENTS

| | | |
|---|---|---|
| DE | 2 337 367 | 2/1974 |
| GB | 280746 | 11/1927 |
| GB | 1 458 814 | 12/1976 |

OTHER PUBLICATIONS

Michael B. Antosiewicz, New Techniques for Aligning and Maintaining Large Ring Gears, Sep. 1981, The Falk Corporation, Milwaukee, Wisconsin.

* cited by examiner

Primary Examiner—Diego Gutierrez
Assistant Examiner—Yaritza Guadalupe
(74) Attorney, Agent, or Firm—Foley & Lardner

(57) ABSTRACT

A method and apparatus for determining a pinion bearing move to correct pinion-to-gear alignment based on pinion Δ t overcoming the aforementioned drawbacks are provided. Using a realistic visual representation of a gear to pinion mesh showing pressure angles of the gear and pinion as well as the angle of the pinion down from the mill center line allows for a quick and accurate determination of a pinion bearing to align a pinion-to-gear assembly move. Using temperature differential data of the pinion under load conditions, the present invention allows for an easy and efficient means of determining a pinion bearing move to align a pinion-to-gear assembly without requiring complicated manual calculations or data input to a computer program. Furthermore, the present invention is lightweight and portable thereby avoiding the drawbacks often associated with handheld electrical devices and laptop computers.

37 Claims, 7 Drawing Sheets

METHOD AND APPARATUS FOR DETERMINING A PINION BEARING MOVE TO ALIGN A PINION-TO-GEAR ASSEMBLY

BACKGROUND OF INVENTION

The present invention relates generally to pinion-to-gear alignment and, more particularly to, a method and apparatus for determining a pinion bearing move to achieve proper pinion-to-gear alignment based on temperature differentials of a pinion and a visual representation of a pinion-gear assembly.

Pinion-gear assemblies are widely used in a number of industrial and commercial systems, such as grinding mills. Conventional grinding mills are typically driven by a ring gear attached to the body of the mill. An electric motor or, in some circumstances, a gasoline powered engine, drives a pinion which powers the ring gear. To minimize wear and tear on the gear and pinion as well as to prevent costly down time due to broken or damaged teeth on the gear or pinion, it is imperative that the pinion be properly aligned to the ring gear. A number of techniques have been developed to properly align the pinion to the ring gear.

In one known method, an initial alignment of the pinion to the gear is achieved by collecting mechanical readings with feeler gauges and then making the best alignment possible based on those readings. Typically, this initial alignment is made with the pinion in a static condition and having no loads. As is well known, the pinion will take a slightly different position when running and under load conditions. Additionally, the alignment (or load distribution) of the pinion to the gear teeth will generate temperatures that are proportional to the load distribution. Simply, the side of the pinion with the heaviest load distribution will have higher temperatures than the side of the pinion with the lightest load distribution. These temperature differentials of the pinion when running with a load may be used to perform an alignment of the pinion-to-gear to achieve an even load distribution across the pinion teeth.

Complicating matters however, is that grinding mills are often driven by more than one pinion. Further, in grinding mills it is not uncommon for each pinion to be running in two directions. For example, autogenuous and semi-autogenuous mills are typically run in alternating directions in order to achieve longer liner life. Under these conditions, temperature data must be recorded on both pinions and in both directions. Additionally, a gear pressure angle, an angle of each pinion down from the mill center line, and a rotation of the mill while taking the temperature readings must be known in order to calculate a proper pinion move for realignment thereof. A number of computer programs have been developed to calculate pinion realignments based on temperature data. These specific programs are particularly well suited when the proper data is input directly into the program. However, it is relatively easy to make a mistake in the input of data into the computer program which ultimately could result in a damaged or broken gear or pinion due to an ill-advised alignment move. Additionally, manual calculations may be used to calculate a pinion realignment move, but manual calculations require considerable time and an extensive working knowledge of geometry as well as trigonometry.

It would therefore be desirable to design an apparatus and method for determining a pinion bearing move to align a pinion-to-gear assembly quickly and less prone to error without requiring a computer program or a number of complex manual calculations.

BRIEF DESCRIPTION OF INVENTION

A method and apparatus for determining a pinion bearing move to align a pinion-to-gear assembly overcoming the aforementioned drawbacks are provided. Using a realistic visual representation of a gear to pinion mesh showing pressure angles of the gear and pinion as well as the angle of the pinion down from the mill center line allows for a quick and accurate determination of a pinion bearing move to align the pinion-to-gear. Using temperature differential data of the pinion under load conditions, the present invention allows for an easy and efficient means of determining a pinion bearing move to align the pinion-to-gear without requiring complicated manual calculations or data input to a computer program. Furthermore, the present invention is lightweight and portable thereby avoiding the drawbacks often associated with handheld electrical devices and laptop computers.

Therefore, in accordance with an aspect of the present invention, a method for determining a pinion bearing move for a pinion-to-gear alignment assembly comprises positioning a gear tooth to a first angle and positioning a pinion tooth to a starting position. The method further includes determining a pinion temperature differential, $\Delta t$, and repositioning the pinion tooth to a corrected position based on the pinion temperature differential. The method further includes determining a distance from the starting position to the corrected position.

In accordance with another aspect of the present invention, a nomograph includes a gear tooth having a number of temperature gradient reference marks. The nomograph further includes a pinion tooth having a pair of aligned reference lines. The nomograph further includes a gradient grid having a plurality of reference points for determining a pinion bearing adjustment move.

In accordance with yet another aspect of the present invention, a tool for realigning a pinion to gear assembly is provided. The tool includes a visual representation of a gear to pinion mesh illustrating pressure angles of a gear and pinion assembly. The tool further includes an instructional manual having a set of instructions for determining one or more pinion bearing moves based on one or more pinion temperatures.

Various other features, objects, and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
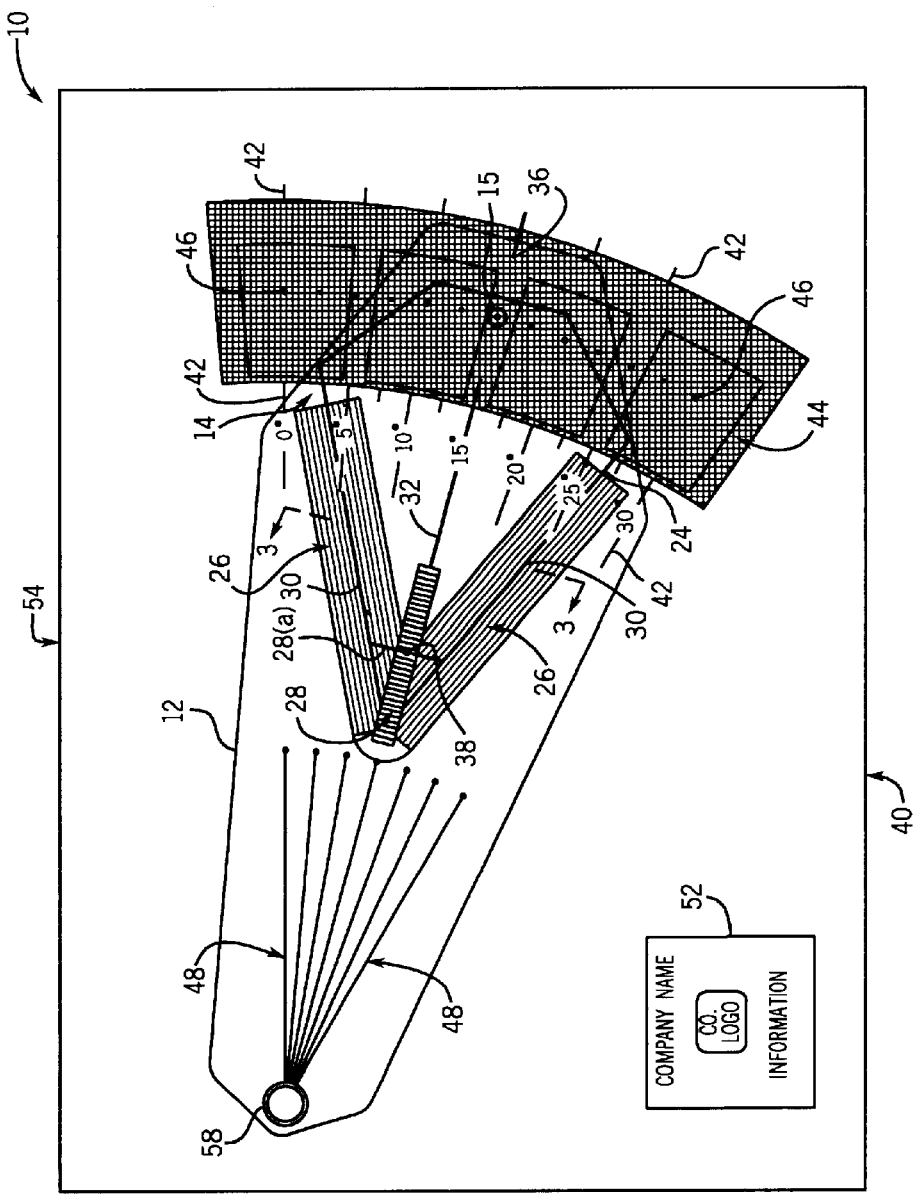
FIG. 1 is a top view of a nomograph in accordance with the present invention.
Figure 2:
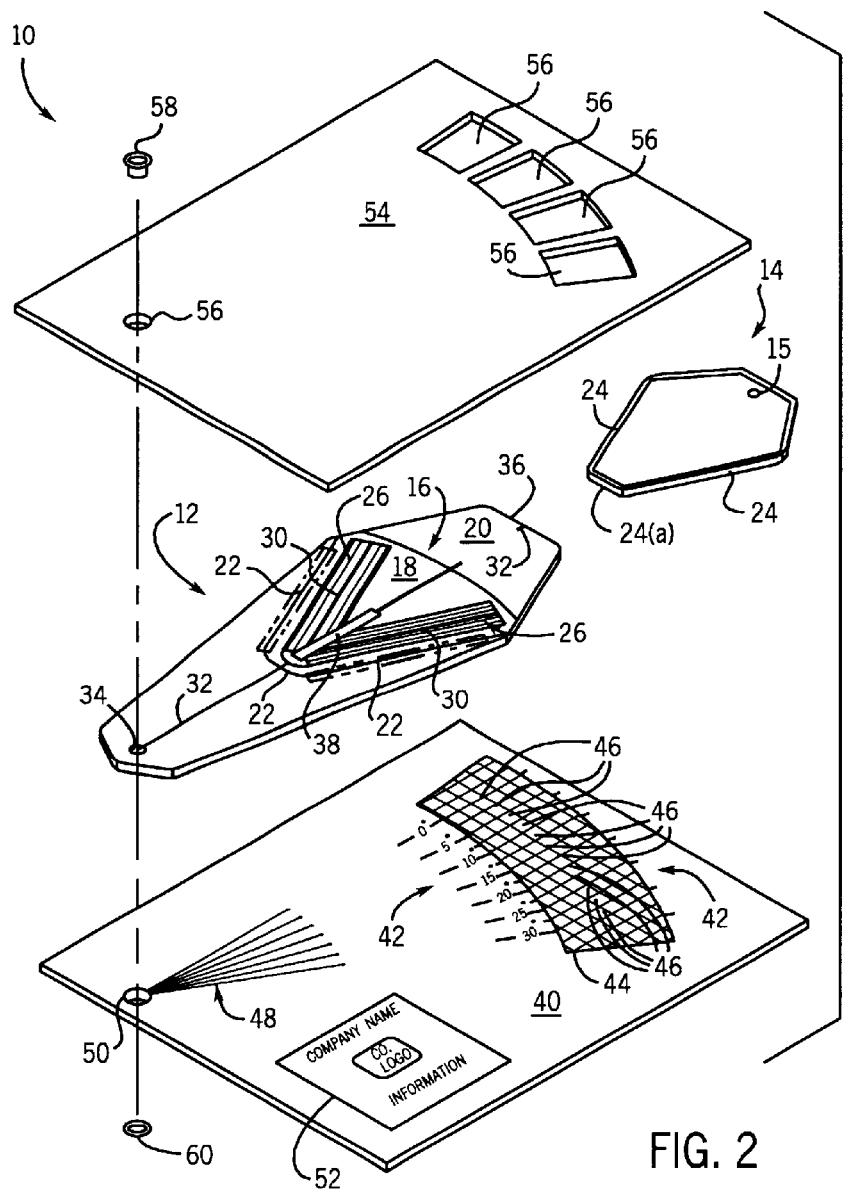
FIG. 2 is an exploded view of the nomograph of FIG. 1.

Referring to FIGS. 1–2, a nomograph 10 for determining a pinion bearing move to align a pinion-to-gear assembly based on temperature differentials of a pinion-gear assembly is shown. Nomograph 10 includes a gear tooth 12 and a pinion tooth 14. In a preferred embodiment, pinion tooth 14 has a polygonal shape and a reference eyelet 15, and is configured to be slidably positioned in pocket 16 of gear tooth 12. Gear tooth 12 has a top surface 18 and an extending bottom surface 20 that cooperatively form pocket 16. Movement of the pinion tooth 14 into pocket 16 is limited by a pair of convergent interfaces 22 joining the outer surface 18 to bottom surface 20. That is, movement of pinion tooth 14 is prevented by the abutment of pinion tooth sidewalls 24 against interfaces 22. Gear tooth 12 further includes a number of gradient reference lines 26 as well as a number of root change reference lines 28. Two sets gradient reference lines 26 converge to an intersection (not shown) resulting in a mirrored alignment of the two sets. Additionally, each set of gradient reference lines includes a starting reference line 30 that is centrally disposed between the remaining reference lines 26. Furthermore, reference line 30, in a preferred embodiment, is conspicuously identified using a bold type.

Gear tooth 12 further includes a linearly extending positioning line 32 that extends along a bottom surface 20. Line 32 extends from an eyelet 34 laterally through the intersection of the sets of reference lines 26 and is hiddenly positioned underneath the number of vertically oriented linearly arranged root reference lines 28. Reference line 32 then extends from underneath the number of root reference lines 28 laterally along surface 20. After a momentary break, line 32 begins again along surface 20 and extends to an outer edge 36 of gear tooth 12. Gear tooth 12 further includes an alignment point 38 centrally disposed along one of the root reference lines 28.

Nomograph 10 further includes an opaque base portion 40 having along the surface thereof a plurality of reference angle marks 42 angularly positioned from one another at, in a preferred embodiment, 5° intervals. A curvilinear grid 44 is also positioned along a top surface of base portion 40 and includes a plurality of angularly aligned reference points 46. Reference points 46 are linearly aligned with angle reference marks 42. Base portion 40 further includes a plurality of angular reference lines 48 extending angularly towards and in corresponding alignment with reference marks 42 from eyelet 50. Base portion 40 may alternatively include a company name and logo section 52.

Nomograph 10 further includes a transparent sheath portion 54 having a plurality of curvilinearly aligned access windows 56. As will be discussed shortly, reference windows 56 enable a user to slidably position pinion tooth 14 within pocket 16 of the gear tooth 12. Sheath 54 further includes an eyelet 56 that is aligned with eyelet 34 of gear tooth 12 and the eyelet 50 of the base portion 40. Sheath 54, gear tooth 12, and base portion 40 are fasteningly connected to one another by a peg 58, FIG. 2, disposed through eyelets 56, 34, and 50. An angular ring or clamp 60, FIG. 2, is used to secure components 12, 40, and 54 of nomograph 10 to one another.

Figure 3:
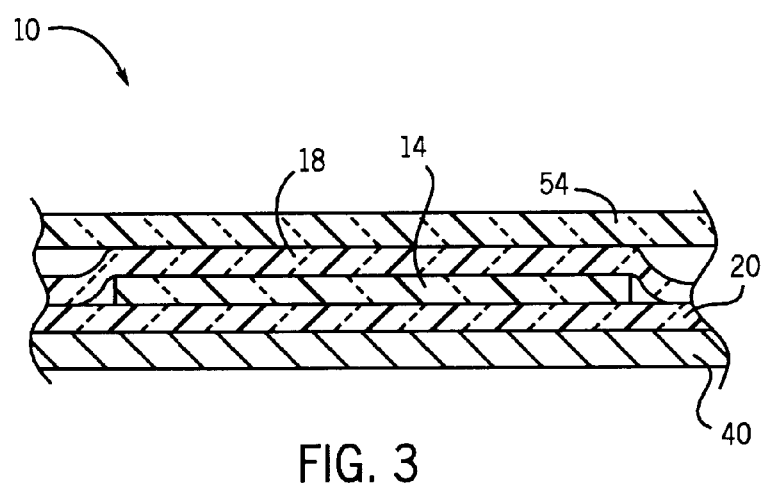
FIG. 3 is a cross-sectional view of the nomograph of FIG. 1.

Referring to FIG. 3, a cross-sectional view of nomograph 10 is shown illustrating the layered construction of sheath 54, gear tooth top surface 18, pinion tooth 14, gear tooth bottom surface 20, and base portion 40. As shown, surface 20 of gear tooth 12 rests above base portion 40 but below pinion tooth 14. Further, as is readily shown, sheath 54 is positioned atop the gear tooth surface 18 and pinion tooth 14.

Figure 4:
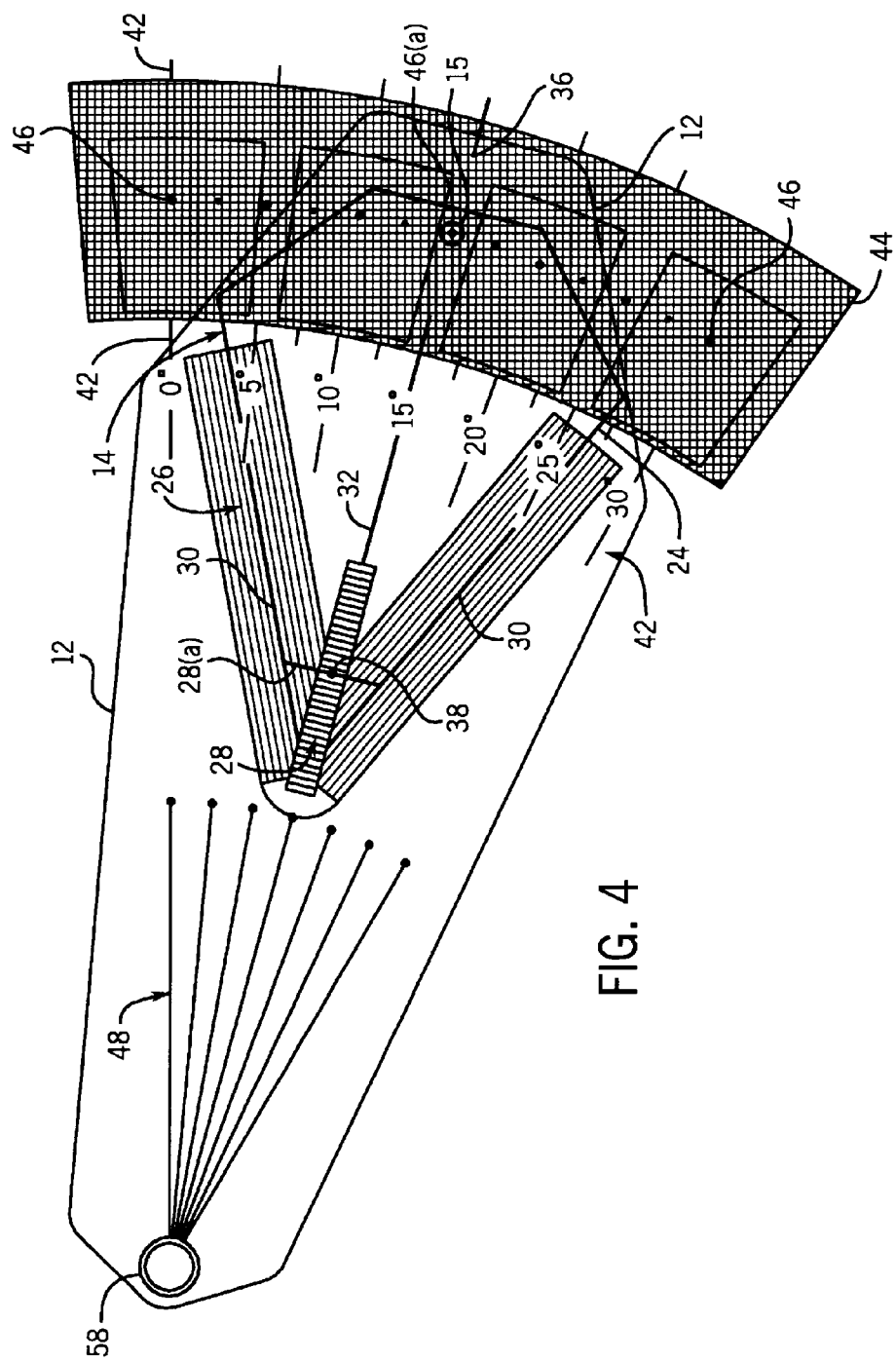
FIG. 4 is a top view of a portion of the nomograph of FIG. 1 showing a pinion tooth at a starting position.

Referring to FIG. 4, the gear tooth 12 and the pinion tooth 14 are shown positioned in one of a number of starting positions. That is, the gear tooth 12 is positioned such that reference line 32 is linearly aligned with the angle reference mark 42 corresponding to 15°. Further, pinion tooth 14 is positioned within pocket 16 such that gear tooth sidewalls 24 align with bolded gradient reference lines 30. Further, pinion tooth leading edge 24(a) is positioned to align with root reference line 28(a). As a result of aligning the pinion tooth sides 24 and edge 24(a) with reference lines 30, 28(a), the pinion tooth eyelet 15 is aligned over a grid reference point 46 and, in the position illustrated in FIG. 4, the pinion tooth eyelet 15 would be positioned over grid reference point 46(a) which corresponds to angle reference mark 15°.

Angle reference lines 42 correspond to an angle below mill center line. Therefore, positioning the gear tooth reference line 32 as shown in FIG. 4 corresponds to a 15° angle below mill center line. That is, the present invention is designed such that gear tooth 12 may pivot angularly from eyelet 56 such that a number of mill center line angles may be selected. While FIG. 4 sets forth angles ranging from 0 to 30° at 2½° intervals, this is shown for illustrative purposes only and is not meant to limit the scope nor the breadth of the instant invention. Further, the present invention is designed such that gear tooth 12 may be repositioned along any angular line while the pinion tooth 14 is slightably engaged within pocket 16. Angular movement of the gear tooth-pinion tooth assembly 12, 14 may be achieved by simply moving gear tooth 12 and pinion tooth 14 through access windows 56 of sheath 54, FIG. 2.

Figure 5:
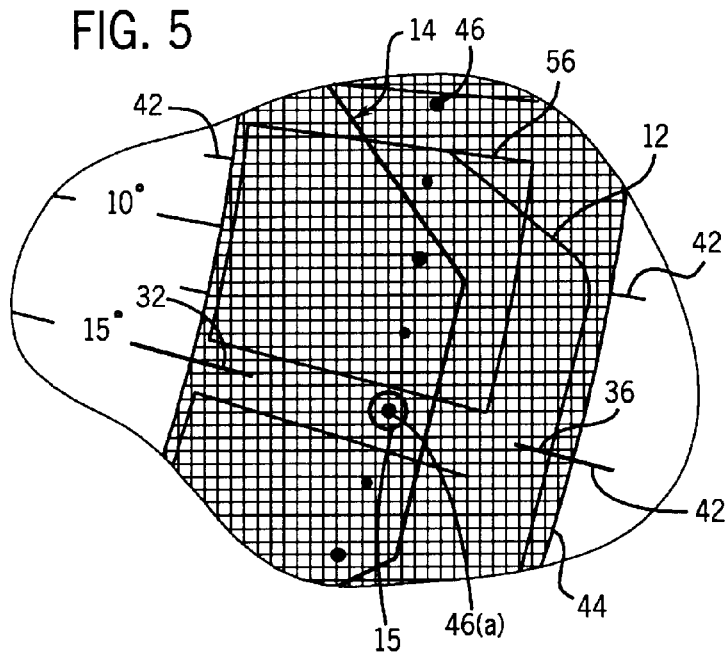
FIG. 5 is an enlarged view of a portion of the nomograph shown in FIG. 4.

FIG. 5 shows an enlarged view of the starting position achieved by placement of pinion tooth 14 within pocket 16 of gear tooth 12. As may be readily seen, pinion tooth eyelet 15 is positioned such that grid point 46(a) of gradient grid 44 is centrally positioned within the eyelet 15. As indicated previously, this positioning of the gear tooth and pinion tooth is achieved when the gear tooth 12 is positioned to reflect a 15 below mill center line location of the pinion bearing assembly.

Figure 6:
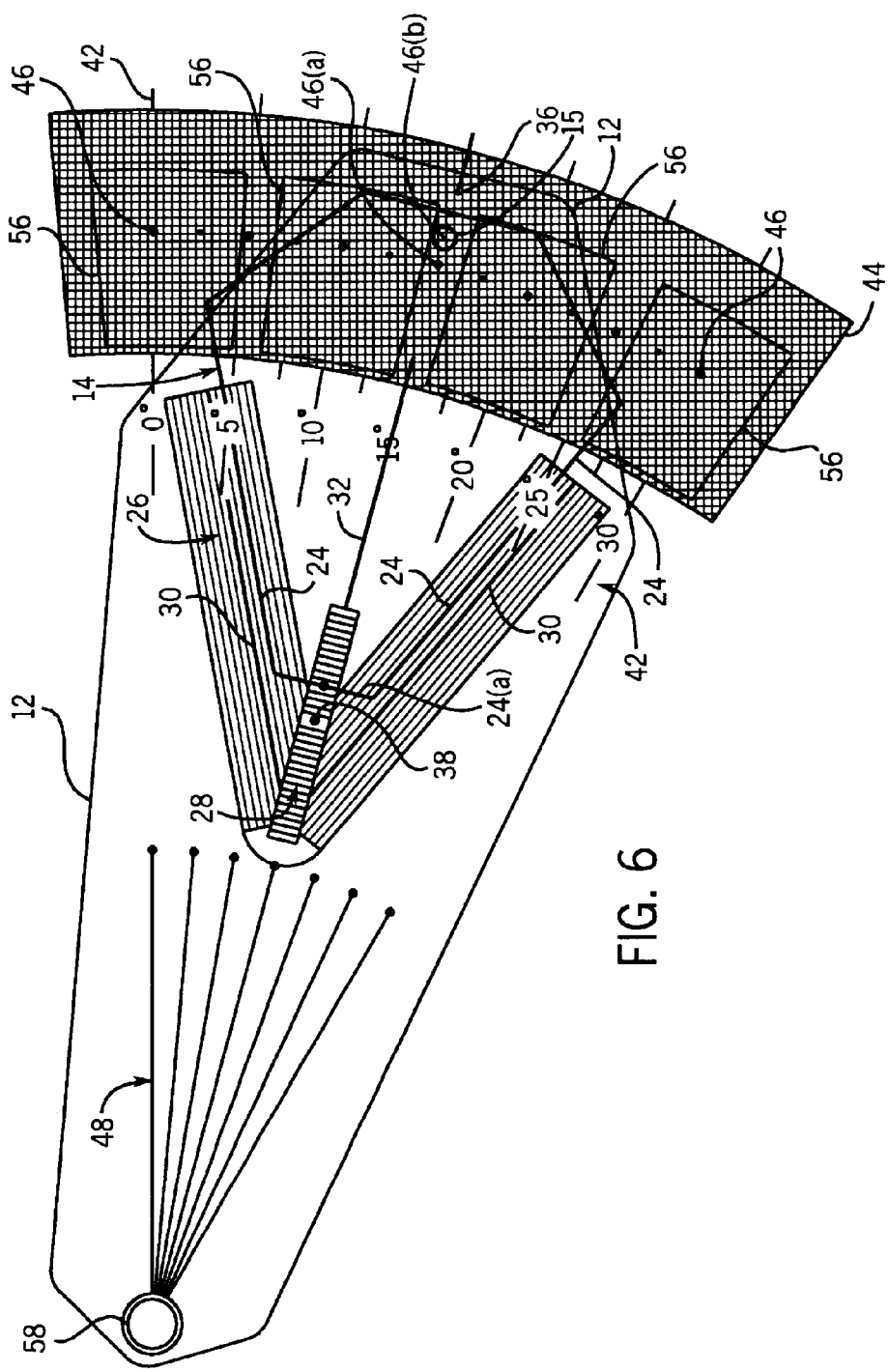
FIG. 6 is a top view of a portion of the nomograph of FIG. 1 showing movement of a pinion tooth to a corrected position in accordance with the present invention.

Now referring to FIG. 6, the gear tooth-pinion tooth assembly 12, 14 is shown such that the position of the pinion tooth 14 within the pocket 16 and the gear tooth 12 have been moved to a corrected position 46(b). Determining the proper pinion move to achieve corrected position 46(b) is based upon pinion temperatures recorded of the pinion gear assembly. In one preferred embodiment, the pinion temperatures are recorded using an infrared heat gun whereupon temperatures are determined over a number of time intervals. These temperature readings are used to determine a temperature differential, Δt. For a dual direction mill, temperatures are recorded for both into mesh and out of mesh directions. The determined temperature differential of the pinion is then used to determine a scale for the pinion temperature change per gradient. For example, if the pinion temperature differential is greater than 30° F. and less than or equal to 60° F., then each gradient line 26 of the gear tooth 14 represents a 10° F. interval. If the pinion temperature differential is greater than 15° F. and less than or equal to 30°

F., then each gradient reference line 26 represents a 5° F. interval. If the pinion temperature differential is less than 15° F., each gradient reference line 26 represents a 2½° F. interval. Furthermore, if the pinion tooth is moved laterally toward the gradient grid 44, an "out of mesh" pinion move is being represented. However, if the pinion tooth is moved laterally away from the gradient grid 44, an "into mesh" pinion move is being represented. If the pinion teeth on the top half of the pinion diverge with the gear teeth, this is considered to be "out of mesh" rotation. Conversely, if the pinion teeth on the top half of the pinion converge with the gear teeth, this is considered to be "into mesh" rotation.

Figure 7:
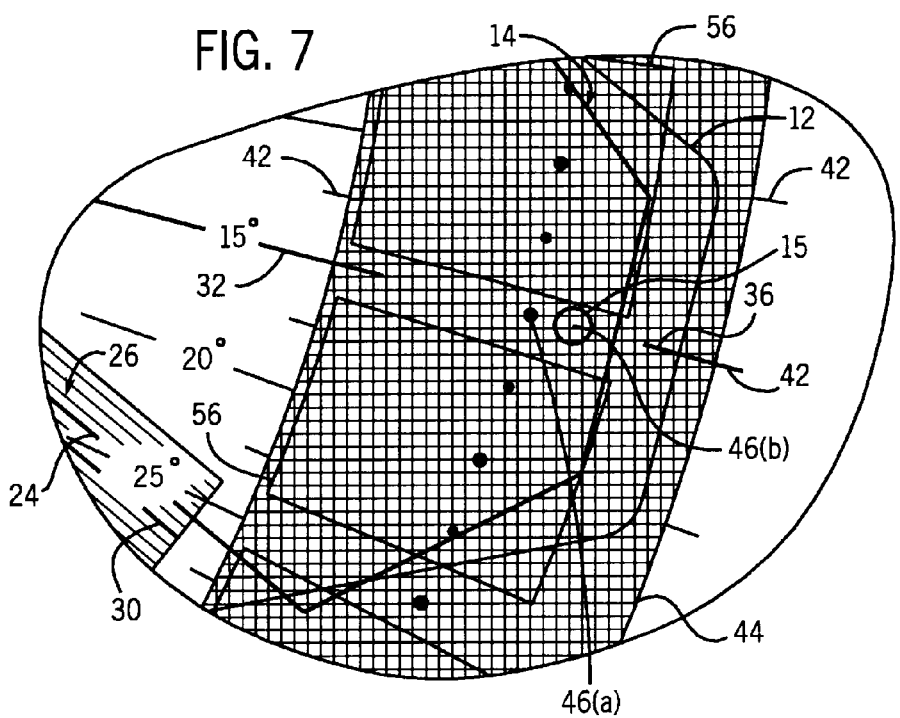
FIG. 7 is an enlarged view of a portion of the nomograph shown in FIG. 6 illustrating movement of the pinion tooth from a starting position to a corrected position in accordance with the present invention.

Now referring to FIG. 7, an enlarged view of the corrected position 46(b) illustrated in FIG. 6 is shown. As readily shown in FIG. 7, the pinion tooth 14 has been moved "out of mesh" by two gradient lines as indicative by pinion tooth sidewalls 24 being moved inward of gradient reference line 30 by two gradient lines 26. This "out of mesh" movement of the pinion tooth 14 results in pinion tooth opening highlighting a new gradient grid point or corrected position 46(b).

Once the pinion tooth 14 has been repositioned according to the proper temperature differential scale, it is possible to determine an appropriate pinion bearing move to correct for the measured temperature differential. That is, referring to the individual gradients of gradient grid 44 and by determining a position of the corrected position 46(b) compared to the starting position 46(a) and by measuring and determining the number of gradients along an x and y axis from the starting reference position 46(a) to the corrected position 46(b), it is possible to determine the appropriate pinion bearing move to correct the pinion alignment to the gear of a grinding mill. For example, the corrected position 46(b) corresponds to approximately 3½ gradients along an x axis and one gradient downward along a y axis to the corrected position 46(b). Therefore, to correct for the recorded temperature differentials, it is necessary to move the pinion out of the mesh 3½ gradients and downward one gradient.

Determining the value of each gradient depends upon which temperature differential scale was used to determine pinion tooth repositioning. That is, in one embodiment, each gradient represents 0.5 thousandths of an inch if the pinion tooth was repositioned according to a 2½° F. gradient scale. Additionally and as best shown in FIG. 6, repositioning of the pinion tooth 14 causes a repositioning of pinion tooth leading edge 24(a). The number of root gradient lines between initial position 38 and the position following movement of the pinion tooth is indicative of the relative root change of the pinion gear assembly that will result once the pinion gear assembly is recalibrated to correct the temperature differentials. Like each gradient of grid 44, each root change line 28 has a different value depending upon which temperature differential scale was used in moving the pinion tooth. For example, if each gradient reference line 36 represents a 2½° F. per gradient change, then each root line 28 represents 0.25 thousandths of an inch of change. The table below sets forth the additional root change and pinion bearing per gradient values for each temperature differential scale.

| | PINION TEMPERATURE CHANGE/GRADIENT | | |
|---|---|---|---|
| SCALE NO. | CHANGE IN PINION TEMP PER GRADIENT (*) | PINION BEARING MOVE (*) | RELATIVE ROOT CHANGE (*) |
| 1 | 2.5° F./GRAD. | .0005"/GRAD. | .00025/GRAD. |
| 2 | 5.0° F./GRAD. | .001"/GRAD. | .0005"/GRAD. |
| 3 | 10.0° F./GRAD. | .002"/GRAD. | .001"/GRAD. |

(*) These values assume the pinion face width is half the distance between the pinion bearing centerlines, the mill is drawing full power, and the gear and pinion tooth pressure angles are 25°.

By determining the appropriate values, it is possible for a service technician, engineer, etc. to determine the appropriate pinion move.

Figure 8:
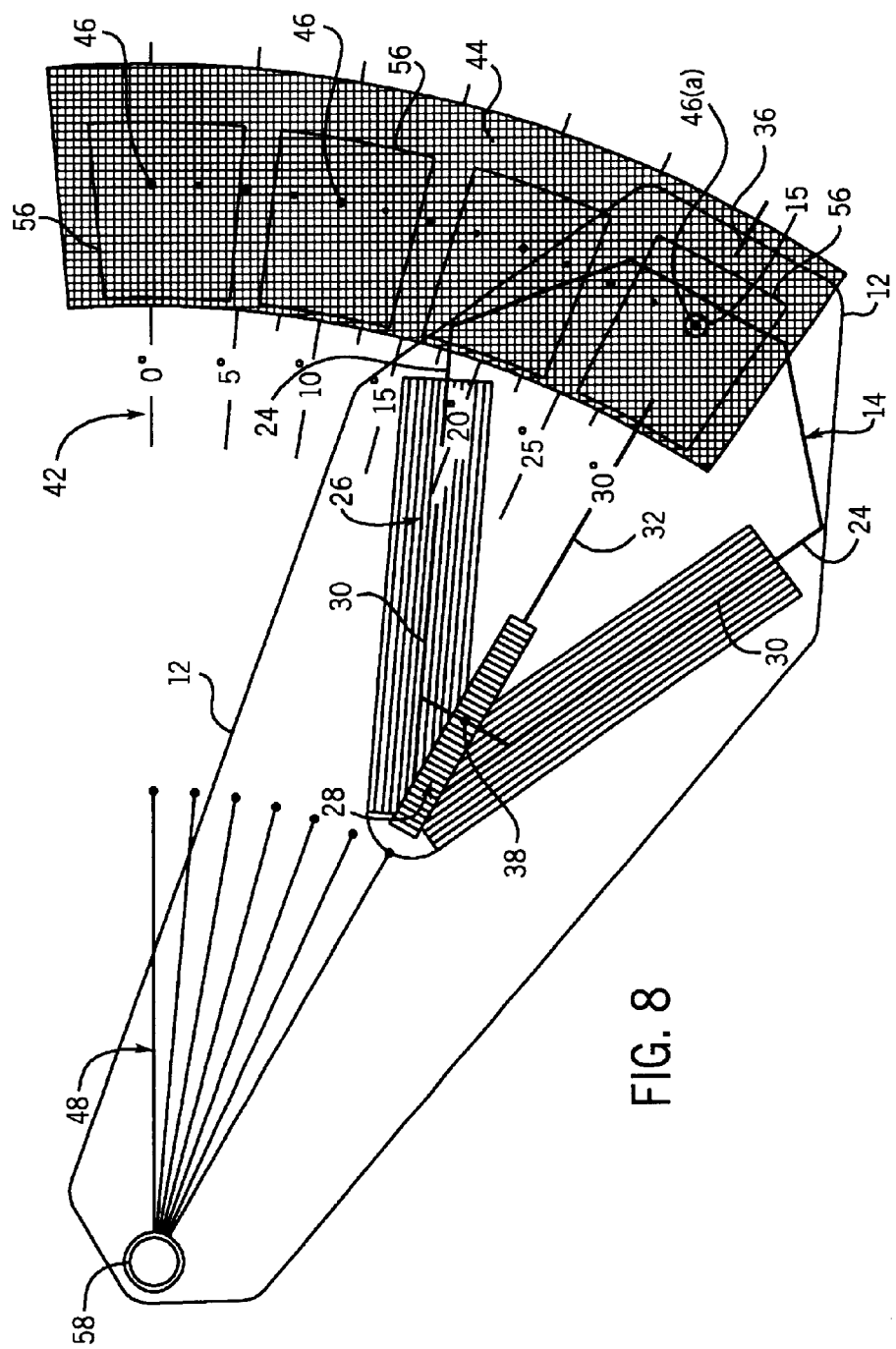
FIG. 8 is a top view of a portion of the nomograph shown in FIG. 1 illustrating annular movement of a gear tooth and a pinion tooth in accordance with the present invention.

As indicated previously and referring to FIG. 8, the present invention is designed such that gear tooth 12 and pinion tooth 14 may be aligned at any number of angles depending upon the angle of the pinion bearing below mill center line. The gear tooth 12 and the pinion tooth 14 are positioned at a starting reference point 46(a) and at a 30° angle below mill center line. As indicated previously, the range of angles shown in FIG. 8 represent only one embodiment of the present invention and is not intended to limit the scope thereof.

Therefore, the present invention includes a method for determining a pinion bearing move to align a pinion-to-gear assembly. To determine the proper realignment move, the gear tooth is set to a proper angle below mill center line. The pinion tooth is then inserted or positioned into a pocket of the gear tooth such that the eyelet of the pinion tooth is positioned over a starting reference point. Temperature differentials recorded from the pinion gear assembly are then analyzed to determine the appropriate scale for a pinion temperature change per gradient. Simply, the highest temperature differential recorded over a series of time intervals determines which pinion temperature change per gradient scale is to be used. Once the appropriate scale has been determined, the pinion tooth is accordingly moved to correct for the differential in temperature. For example, if the pinion temperature differential for the "out of mesh" rotation is 10° F., then each gradient line of the gear tooth corresponds to 2½° F. Therefore, to increase the pinion temperature by 10° F., the pinion tooth must be moved closer to mesh four gradient lines for the "out of mesh" rotation. Conversely, if the pinion temperature for the "out of mesh" rotation is to be decreased by 10° F., the pinion tooth is moved away from the mesh four gradient lines for the "out of mesh" rotation. Moving the pinion tooth the requisite number of gradient lines to account for the temperature differentials will result in the eyelet of the pinion tooth to be repositioned. The distance of the new position of the eyelet in relation to the starting position may then be used to determine the appropriate pinion bearing move. Simply, the pinion bearing move of the pinion gear assembly required to reduce the pinion temperature differential to zero is the difference between the pinion bearing starting reference point and the end point of the pinion tooth target after correction. After determining the distance in an x and in a y direction between the final position and the initial reference position, it is necessary to determine the appropriate scale to use in determining the pinion bearing realignment move. As discussed previously, the appropriate pinion bearing move as well as relative root change may be determined based upon which temperature gradient scale that was selected for moving the pinion tooth to the final corrected position.

Determining appropriate pinion bearing moves to correct pinion-to-gear alignment in accordance with the present invention are easy, quick and accurate. Furthermore, the present invention may also be used not only as an in-field product to recalibrate grinding mills and other pinion bearing assemblies, but may also be used as a teaching tool for those learning pinion gear alignments. The visual representation of the actual gear-pinion pressure angles and the pinion positions down from mill central line enables students to ascertain gear pressure angles, angles of the pinions below mill central line, and why and how pinion alignment corrections may be made. Further, those learning pinion alignment correction techniques may implement the present invention without having to input a significant amount of data into a computer program or solving a number of highly complex and often geometrical and trigometrical mathematical calculations. Further, the present invention also contemplates including a series of instructions on a reverse side of base portion 40, FIG. 2, for instructing users on determining pinion bearing moves to correct pinion-to-gear alignments in accordance with the teachings of the present invention.

Therefore, in accordance with an embodiment of the present invention, a method for determining a pinion bearing move to correct pinion-to-gear alignments for a pinion-gear assembly comprises positioning a gear tooth to a first angle and positioning a pinion tooth to a starting position. The method further includes determining a pinion temperature differential, $\Delta t$, and repositioning the pinion tooth to a corrected position based on the pinion temperature differential. The method further includes determining a distance from the starting position to the corrected position.

In accordance with another embodiment of the present invention, a nomograph includes a gear tooth having at least one set of a number of temperature gradient reference lines. The nomograph further includes a pinion tooth having a pair of aligned reference points. The nomograph further includes a gradient grid having a plurality of reference points for determining a pinion adjustment move.

In accordance with yet another embodiment of the present invention, a tool for realigning a pinion gear assembly is provided. The tool includes a visual representation of a gear to pinion mesh illustrating pressure angles of a gear and pinion assembly. The tool further includes an instructional manual having a set of instructions for determining one or more pinion bearing moves based on one or more pinion temperatures.

The present invention has been described in terms of the preferred embodiment, and it is recognized that equivalents, alternatives, and modifications, aside from those expressly stated, are possible and within the scope of the appending claims.

What is claimed is:

1. A tool for determining pinion adjustment, the tool comprising:
    a first portion having a plurality of temperature gradient reference marks including a first mark and a second mark;
    a second portion having a gradient grid representing pinion adjustment distances; and
    a third portion having at least one first reference point and a second reference point fixed relative to the at least one first reference point, wherein the third portion is movable relative to the first portion and the second portion to reposition the at least one first reference point from a first location proximate the first mark to a second location proximate the second mark and to reposition the second reference point from a third location proximate the grid to the fourth location proximate the grid, wherein a distance between the third location and the fourth location corresponds to a determined pinion adjustment distance.

2. The tool of claim 1, wherein the plurality of temperature gradient reference marks includes a first set of parallel lines.

3. The tool of claim 2, wherein the plurality of temperature gradient reference marks includes a second set of parallel lines converging with the first set of parallel lines.

4. The tool of claim 1, wherein the at least one first reference point includes a first side of the third portion.

5. The tool of claim 4, wherein the at least one first reference point includes a second side converging towards the first side.

6. The tool of claim 1, wherein the second reference point is defined by an eyelet.

7. The tool of claim 1, wherein the first portion includes a plurality of root change reference marks, wherein the second portion includes a third reference point, wherein repositioning of the at least one first reference point from the first location to the second location further results in repositioning of the third reference point from a fifth location to a sixth location and wherein a distance between the fifth location and the sixth location corresponds to a root change distance associated with the determined pinion adjustment distance.

8. The tool of claim 7, wherein the third reference point comprises an edge of the second portion.

9. The tool of claim 1, wherein the second portion further includes a plurality of reference angle marks, wherein the first portion includes a gear tooth reference mark and wherein the first portion is movable relative to the second portion to position the gear tooth reference mark proximate one of the plurality of reference angle marks.

10. The tool of claim 9, wherein the first portion is pivotably coupled to the second portion.

11. The tool of claim 9, wherein the plurality of reference angle marks corresponds to a gear tooth angle below mill center line.

12. The tool of claim 9, wherein the reference angle marks range from 0 degrees to at least 30 degrees.

13. The tool of claim 1, wherein the third portion is configured to represent a pinion tooth.

14. The tool of claim 13, wherein the second portion is configured to represent a gear mesh bounded by two gear teeth.

15. The tool of claim 1, wherein the third portion visually represents a pressure angle of a pinion tooth.

16. The tool of claim 15, wherein the pressure angle is 25 degrees.

17. The tool of claim 1, wherein the first portion includes a cavity at least partially receiving the third portion.

18. The tool of claim 1, wherein the temperature gradient grid is curvilinear.

19. A method for determining a pinion bearing move to align a pinion for a pinion-to-gear assembly, the method comprising:
    providing a tool having at least a first portion and a second portion;
    positioning the first portion having a first reference point and a second reference point relative to the second portion such that the first reference point is adjacent a first location and such that the second reference point is adjacent a second location;

determining a pinion temperature differential;

repositioning the first portion relative to the second portion to move the first reference point from the first location to a third location based upon the determined pinion temperature differential, wherein such repositioning results in the second reference point being moved to a fourth location; and determining a distance between the second location and the fourth location, wherein the distance corresponds to a pinion-bearing move.

20. The method of claim 19, wherein the first location is proximate a first temperature gradient reference mark and wherein the third location is proximate a second temperature gradient reference mark.

21. The method of claim 19, wherein the second location and the fourth location are proximate a grid.

22. The method of claim 21 including:

determining a grid scale for the grid based upon the determined pinion temperature differential; and determining the pinion bearing move using the distance and the grid scale.

23. The method of claim 19, wherein the second portion includes a plurality of temperature gradient marks including a first temperature gradient mark and a second temperature gradient mark and wherein the method further includes determining a temperature gradient scale for the plurality of temperature gradient marks based upon the determined pinion temperature differential, wherein the step of moving the first reference point from the first location to the second location is based upon the determined scale.

24. The method of claim 23, wherein the second location and the fourth location are proximate a grid.

25. The method of claim 24 including:

determining a grid scale for the grid based upon the determined pinion temperature differential; and determining the pinion bearing move using the distance and the grid scale.

26. The method of claim 19, wherein the first reference point is formed by a side of the first portion.

27. The method of claim 19, wherein the tool includes a third portion having a grid, wherein the second location and the fourth location are proximate the grid and wherein the method further includes positioning the second portion relative to the grid based upon an angle of a pinion to be moved below an associated mill center line.

28. The method of claim 27, wherein the step of positioning the second portion includes pivoting the second portion relative to the third portion.

29. The method of claim 27 including aligning a reference mark of the second portion with an angle reference mark on the third portion corresponding to the angle of the pinion below the associated mill center line.

30. The method of claim 19, wherein the step of determining a pinion temperature differential includes detecting a first temperature at a first axial end of a pinion to be moved running under load using an infrared heat gun, detecting a second temperature at a second opposite axial end of the pinion to be moved running under load and comparing the first temperature with the second temperature.

31. The method of claim 19, wherein the second location and the fourth location are proximate a grid and wherein the step of determining a distance between the third location and the fourth location includes determining a number of gradients along at least one of an "X" axis and a "Y" axis from the second location to the fourth location.

32. The method of claim 19, wherein the first portion visually represents the pinion tooth.

33. The method of claim 19, wherein the second portion visually represents a gear mesh between adjacent gear teeth.

34. The method of claim 19, wherein the step of positioning the first portion relative to the second portion includes sliding the first portion relative to the second portion.

35. The method of claim 19, wherein the first portion includes a third reference point and wherein repositioning the first portion relative to the second portion based upon the determined pinion temperature differential results in movement of the third reference point from a fifth location to a sixth location and wherein the method further includes determining a root distance between the fifth location and the sixth location, wherein the root distance corresponds to a root change of the primary bearing move.

36. The method of claim 35 including:

determining a root change scale based upon the determined pinion temperature differential; and determining the root change of the pinion bearing move using the root distance and the scale.

37. The method of claim 35, wherein the fifth location is proximate a first root change reference mark and wherein the sixth location is proximate a second root change reference mark.

* * * * *